(12) United States Patent
Simpson

(10) Patent No.: US 6,440,314 B1
(45) Date of Patent: Aug. 27, 2002

(54) METHOD FOR DESTROYING CHLORITE IN SOLUTION

(75) Inventor: Gregory D. Simpson, Seabrook, TX (US)

(73) Assignee: Vulcan Chemical Technologies, Inc., West Sacramento, CA (US)

( * ) Notice: Subject to any disclaimer, the term of this patent is extended or adjusted under 35 U.S.C. 154(b) by 36 days.

(21) Appl. No.: 09/753,891

(22) Filed: Jan. 3, 2001

(51) Int. Cl.[7] .................................................. C02F 1/70
(52) U.S. Cl. ........................................ 210/757; 210/911
(58) Field of Search ................................. 210/757, 911

(56) References Cited

U.S. PATENT DOCUMENTS

| | | | |
|---|---|---|---|
| 4,609,472 A | 9/1986 | Reynolds et al. | 210/750 |
| 4,851,130 A | 7/1989 | May | 210/750 |
| 5,104,660 A | 4/1992 | Chvapil et al. | 424/445 |
| 5,167,777 A | * 12/1992 | Kaczur et al. | |
| 5,891,339 A | * 4/1999 | Van Ginkel et al. | |

FOREIGN PATENT DOCUMENTS

| | | |
|---|---|---|
| EP | 0 207 633 | 6/1986 |
| EP | 0 196 075 | 10/1986 |
| EP | 0 315 185 | 5/1989 |

OTHER PUBLICATIONS

Peterka—Opflow, American Water Works Association, vol. 24, No. 12, Dec. 1998, pp. 1,4 and 5.
Griese, et al—Chemical Abstracts, vol. 115:166,222s, 1991, p. 457.

* cited by examiner

*Primary Examiner*—Betsey Morrison Hoey
(74) *Attorney, Agent, or Firm*—Sam Rosen; Leonard Bloom

(57) ABSTRACT

Ascorbic acid or one of its isomers, such as erythorbic acid is added in sufficient quantities to a chlorite-containing solution to rid the solution of chlorite. Sufficient ascorbic acid is added to the chlorite-containing solution to convert the chlorite to chloride. Industrial processes employing this process are disclosed.

13 Claims, 1 Drawing Sheet

NaET (drops)

METHOD FOR DESTROYING CHLORITE IN SOLUTION

FIELD OF THE INVENTION

Figure 1:
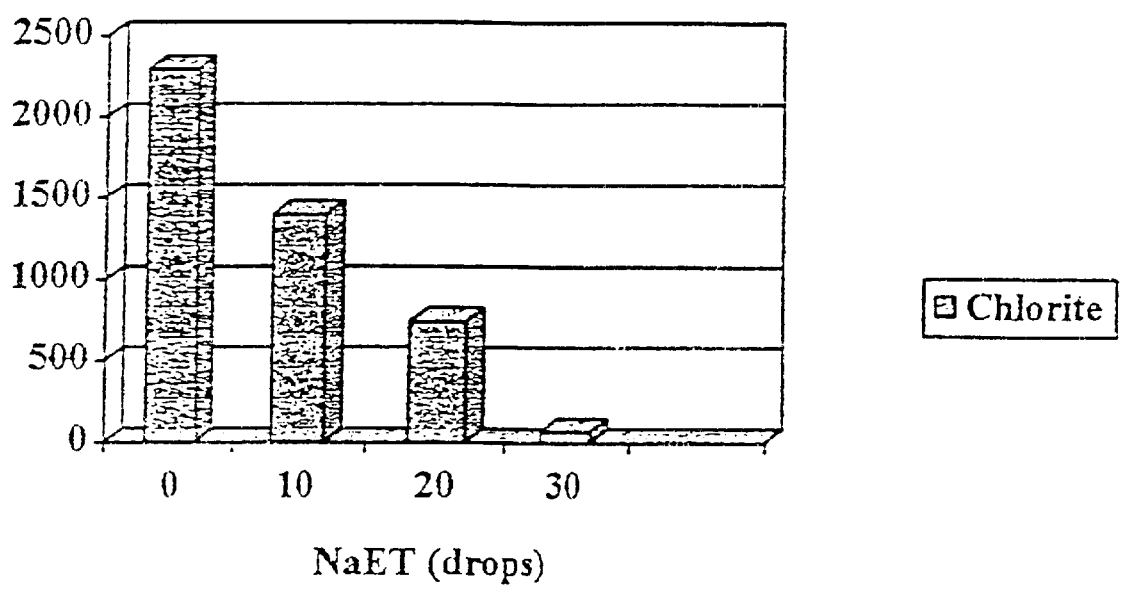

The herein disclosed invention finds applicability in the field of water purification and in the field of toxic waste removal; and specifically where residues of chlorite are found in aqueous solutions.

BACKGROUND OF THE INVENTION

There is a need in the field of water purification to remove chlorite ion from water prior to use or disposing of the water in order to make the water non-toxic. No good way of destroying chlorite ion has been found, until now. Methods have been found, which require pH adjustment, produce sludge, or have some other drawback. Ascorbic acid reaction with chlorite is pH independent from 2.5 to 8.2, probably higher, and destruction of chlorite is virtually instantaneous.

Chlorite is toxic to several invertebrates which are important in the food chain. Chlorine dioxide ($ClO_2$) in disinfection and other applications results in chlorite ion in the water. When this water flows to a receiving stream or other body of water, chlorite must be reduced to very low levels to meet governnent regulations.

Chlorite removal is difficult. Known chlorite removal chemistries are slow, produce sludge, require precise pH control or produce unwanted by-products.

Current regulations in some locations require chlorite ion to be at or below 0.006 ppm in water entering receiving streams; in other locations the amount of chlorite entering the stream may be higher. When chlorine dioxide ($ClO_2$) is used at normal usage levels, typically 0.5–1.0 ppm above demand (which can be higher with 2.0 ppm being typical), a total of 2.5–3.0 ppm $ClO_2$ is used. Approximately 50–80% of this $ClO_2$ is converted to chlorite ion. If 3.0 ppm is fed, 1.5–2.4 ppm of chlorite ion can be produced. This amount varies depending upon water conditions. Under certain conditions, depending on the contents of the water, less chlorite will be produced. Therefore, to use $ClO_2$ for a given application, any reducing chemistry for chlorite destruction must be able to reduce chlorite to chloride ion or some other innocuous species. Since most of these systems are once-through, the water velocity is such that any treatment must act quickly and completely to reduce chlorite before discharge. Therefore, any treatment must reduce chlorite levels to essentially immeasurable levels of innocuous species in a few seconds. The treatment itself must also be innocuous, in the event of over treatment.

REVIEW OF THE PRIOR ART

European Patent 0 196 075

European Patent 0 196 075 describes the preparation of a contact lens cleaning solution wherein ascorbic acid is added to chlorite to accelerate the decomposition of chlorite. In decomposing the chlorite by the use of acid, chlorine dioxide is produced. On page 2 the patent identifies the system as containing a chlorite salt in aqueous solution and an agent for accelerating the decomposition of chlorite. The accelerating agent can be an acid. And on page 5, next to the last line, ascorbic acid is listed as the acid accelerating agent. Note also claim 1, taken with claim 5, identify the agent for accelerating the decomposition of chlorite to form free oxygen as ascorbic acid. The inventive concept of the herein disclosed invention is distinct from that of European patent 0 196 075. The herein disclosed invention employs adequate ascorbic acid to completely inactive the chlorite ion and to convert it to chloride. The European patent does not.

Further note that European 0 196 075, page 19, Table 3, discloses adding 0.01 g of ascorbic acid to a 0.06 g solution of sodium chlorite. These amounts are opposite those used in this invention. The herein disclosed invention for example uses approximately five parts ascorbic acid to destroy one part chlorite.

The formulation of 0 196 075 is designed to release free oxygen from chlorite. Two components are needed. They are (A) an aqueous solution chlorite, and (B) another solid component containing, (i) an agent for accelerating the decomposition of the chlorite to form free oxygen, selected from acids, organic acid salts, ion exchange resins, reducing agents and sugars, and (ii) an agent for consuming excess free oxygen from the decomposition of the chlorite after impurities have been removed.

The patent refers 'forming free oxygen' appears to actually refer to the formation of $ClO_2$. This is the reason acids, organic acid salts, ion exchange resins and sugars are used.

On page 5, paragraph 4, the patent states:

"These agents (acids, organic acid salts, ion exchange resins, reducing agents, and sugars) act as a catalyst for accelerating the decomposition of the chlorite contained in the component A. The agents may function by releasing hydrogen ion, which leads to accelerated decomposition of the chlorite to form free oxygen."

In paragraph 6 of the same page, they state,

"The acid may be any one as long as it provides the function required in the present invention. Preferred examples of the acids include organic acids such as adipic, stearic, sebacic, oxalic, itaconic, edetic, ascorbic; and inorganic acids such as hydrochloric and sulfuric acids. It is more preferred to use tartaric and/or citric acid . . . ."

The inclusion of mineral acids and citric as the preferred embodiment indicates that it is indeed the formation of chlorine dioxide from chlorite that is being referred to here. Just as found in many other patents, when the inventors find an organic acid that appears to be operative, they include other organic acids.

Further in the text, on page 19, in Table 3, a series of products that include chlorite activated by various organic acids. This indicates that the European patent considered ascorbic acid to be just another organic acid. It does not appear that ascorbic acid was recognized as having special properties and considered to be a distinct acid, unlike other organic acids in its effect.

Based on a review of this patent, it appears that what the authors refer to as decomposition of chlorite to form free oxygen is actually activating chlorite to form $ClO_2$. There simply is no recognition in European 0 196 075 of the special reactive nature of ascorbic acid with chlorite to form chloride.

On the other hand, the herein disclosed invention requires substantial amounts of ascorbic acid to destroy the chlorite ion and convert it to chloride. Amounts which are beyond the parameters of the European patent, note as follows: The herein disclosed invention employs approximately 5 ppm ascorbic acid to consume 1 ppm of chlorite ion. This ratio of components is distinct and just the opposite of that of European 0 196 075 which in Table 3, page 19, uses 0.02×3=0.06 g of sodium chlorite with 0.01 g of ascorbic acid. It takes about approximately 5 ppm of ascorbic acid to consume 1 ppm of chlorite ion. The reaction is immediate, pH independent, and results in the formation of the chloride ion. No chlorine dioxide is formed as long as ascorbic acid is in a slight excess.

So far as the *Opflow, American Water Works Association* Vol. 24, No. 12, December 1998, pages 1, 4 and 5 publication is concerned, the reference does not speak of deactivating chlorite. The reference speaks only of reducing chlorine or inactivating "chlorine level". This is distinct from reducing chlorite levels. Nor are the herein disclosed critical proportions of reactants set forth.

European 0 207 633 does disclose both chlorite and ascorbic acid, however, this disclosure is so broad as to not read on your discovery.

Less pertinent references are noted:

Griese, et al—Chemical Abstracts Vol. 115:166,2229 discloses the use of sodium thiosulfate and sulfites to eliminate chlorine dioxide and chlorite ions, residuals, from drinking water.

May U.S. Pat. No. 4,851,130 teaches the use of erythorbate and ascorbate for oxygen removal.

Reynolds in U.S. Pat. No. 4,609,472 teaches the removal of chlorate ions from brine using acid and hydrazine hydrochloride.

Chvapil et al in U.S. Pat. No. 5,104,660 teach an antimicrobial wound dressing which may comprise sodium chlorite and ascorbic acid along with many other components. There is no suggestion in this reference to use ascorbic acid to rid the chlorite ion from an aqueous solution.

European Patent 0 315 185 teaches methods of polymerization in which chlorite and ascorbic acid may be reactants.

Tell et al in European 0 107 633 teaches sterilizing compositions in which ascorbic acid and chlorite may be reactants, however, this reference does not teach the inventive proportion of ingredients or method of use as disclosed herein.

Peterka—Opflow Vol. 24 No. 12, December 1998, pages 1, 4 and 5 teaches ascorbic acid to neutralize chlorine in water. The reference does not teach chlorite in solution or the use of ascorbic acid to destroy chlorite.

Review of Existing Chlorite Reduction Methodologies

Granular Activated Carbon and Reverse Osmosis: Although partial or complete removal of chlorite is possible with these technologies, none of these technologies are practical for large industrial facilities when the throughput is on the orders of 100,000 gallons per minute.

Sulfur Dioxide and Sulfite Ion: $SO_2$ and $SO_3^{2-}$ have been shown to remove $ClO_2^-$ by Gordon.[1] In the pH range 4.0 to 7.5, the reaction is shown below:

$$2SO_3^{2-} + ClO_2^- \rightarrow 2SO_4^{2-} + Cl^-$$

[1] Gordon, G., Slootmaekers, B., Tachiyashiki, S., and Wood, D., "Minimizing Chlorite Ion and Chlorate Ion in Water Treated with Chlorine Dioxide," Journ. AWWA, page 160, April 1990.

In the presence of oxygen and at elevated pHs, the reaction chemistry deviated from the equation shown above.

Dixon et al and Griese et al[2,3] observed that the presence of oxygen in the reduction of chlorite with $SO_2$ or $SO_3^{2-}$ resulted in the formation of chlorate. They suggested that the use of sulfur-based reducing agents for removal of chlorite in potable water was not a viable option.

[2] Dixon, K. L., and Lee, R. G., The Effect of Sulfur-Based Reducing Agents and GAC Filtration on Chlorine Dioxide By Products, J. AWWA, May 1991, page 48.
[3] Griese, M. H., Hauser, K., Berkemeier, M., and Gordon, G., "Using Reducting Agents to Eliminate Chlorine Dioxide and Chlorite Ion Residuals in Drinking Water," J. AWWA, May 1991, page 56.

The reaction of chlorite with $SO_2$ and $SO_3^{2-}$ is complete in less that a minute below a pH of about 5.0.

However, for large industrial once-through applications, where 100,000 gpm through-put is common, it is not feasible nor environmentally acceptable in many cases to add sufficient acid to depress the pH of the water to <5.0 to get rapid chlorite destruction.

Ferrous Iron: Chlorite ion can be reduced to $Cl^-$ by ferrous iron ($Fe^{2+}$), as shown in the following equation.

$$4Fe^{2+} + ClO_2^- + 10H_2O \leftrightarrow 4Fe(OH)_3(s) + Cl^- = 8H+$$

In this reaction, chlorite ion is reduced to chloride ion, and the iron forms a ferric hydroxide floculent which ultimately settles (s) out in the water.

Ondruss et al[4] investigated the kinetics and found that at pH <2.0 and high ionic strength condition (2.00 M), the reaction proceeded at a rate that would be acceptable for potable water plants.

[4] Ondruss, M., and Gordon, G., "The Oxidation of Hexaaquoiron (II) by Chlorine (III) in Aqueous Solution," Inorg. Chem., 11(5), 985(1972).

Ferrous iron ($Fe^{2+}$) has been used with good results by several potable water facilities.[5]

[5] Tarquin, A., Hansel, G., Rittmann, D., "Reduction of Chlorite Concentrations in Potable Water with Ferrous Chloride," Water Engineering and Management, 35 (February, 1995).

The use of ferrous iron may be acceptable for potable water facilities, because they have the capability of handling the sludge produced. In addition, their holding time permits a somewhat slower reaction to proceed. However, for large industrial once-through facilities, ferrous iron is much too slow and the sludge produced is generally environmentally unacceptable.

1. Ozawa, T., and Kwan, T., "Detoxification of chlorine dioxide ($ClO_2$) by Ascorbic Acid in Aqueous Solutions: ESR Studies," Wat. Res 21 (2), 229 (1987) describes problems with $ClO_2$ in potable water. The addition of ascorbic acid to a solution of $ClO_2$ is proposed to produce the following:

$$ClO_2 + AsA > ClO_2^- + AFR$$

$$AFR > AsA + DasA$$

where AsA=ascorbic acid, AFR—ascorbic acid free radical, and DasA=dehydroascorbic acid.

No mention is made in this article of ascorbic acid reacting with chlorite.

2. Collings, G., Yokoyama, M., and Bergen, W., "Lignin as Determined by Oxidation with Sodium Chlorite and a Comparison with Permanganate Lignin," J. Dairy Sci, 61(8), 1156(1978). Sodium chlorite oxidation is a technique of plant research for 30 years, involves taking some plant residue and adding acidified chlorite to the sample. The oxidation reaction is stopped by adding ascorbic acid. However, no mention of chemistry of exactly what is stopped. The implication is that chlorine dioxide oxidation is what is causing lignin removal, and ascorbic acid stops that reaction.

In summary, for large industrial facilities, no good, rapid, environmentally friendly method for reducing chlorite ion has been found.

None of the prior art teaches the use of ascorbic acid in amounts which will convert chlorite in solution to chloride ion.

Objects of the Invention

An object of this invention is to reduce chlorite in aqueous solution to chloride.

A further object of this invention is to reduce chlorite in solution safely and rapidly.

A major object of this invention is to produce a method which will reduce chlorite in a manner which is innocuous.

SUMMARY OF THE INVENTION

The inventor has found that ascorbate ion or its isomers react with chlorite in an unexpected manner. The invention herein disclosed is unique in recognizing that a specific amount of ascorbic acid is required to convert the chlorite ion, not to chlorous acid ($HClO_2$) which disassociates to form chlorine dioxide ($ClO_2$) but to chloride ion ($Cl^-$) which is innocuous in the receiving stream. For example, if the pH of an aqueous solution of chlorite ion is lowered to less than pH 7, by addition of acid, whether organic or inorganic, chlorite ion forms chlorous acid, $HClO_2$, which then dissociates to form chlorine dioxide, $ClO_2$. The rate of reaction is a function of pH, the lower the pH, the more rapid the reaction. From the work of the inventor, it is clear that every acid (e.g., the ones that would dissolve in water) depressed the pH to a greater or lesser extent. The rate at which $ClO_2$ formed was a function of the final pH.

Ascorbic acid, if used at less than about a ratio of 2 moles ascorbic acid to 1 mole chlorite ion, would end up forming $ClO_2$, because of the pH depression. If sufficient ascorbic acid is used, no $ClO_2$ is formed. The chlorite ion reacts with ascorbic acid to form chloride ion. This reaction chemistry is novel and unexpected. The a preferred ratio of ascorbic acid to chlorite would be about 5.2 ppm ascorbic acid to 1 ppm of chlorite.

The inventor observes that when chlorine dioxide is applied to a solution which is to be disinfected, that after the chlorine dioxide does its disinfecting, about 70%–90% of the time, chlorine dioxide reverts back to chlorite ion. The chlorite ion is not decomposed, but is activated to chlorine dioxide, which, after disinfecting, ends up as chlorite ion. The chlorite ion is still in solution. When ascorbic acid is added to chlorite ion at the correct molar ratio, ascorbic acid 'reduces' the chlorite ion to chloride ion, which is innocuous in potable water.

Chlorite ion is a problem in numerous applications, not the least of which is potable water disinfection.

In many instances throughout the specification, approximate ratios or amounts of ascorbic acid to destroy chlorite have been set forth. Tests done in the laboratory have defined the stoichiometry of chlorite destruction by ascorbic/erythorbic acids. The reaction requires approximately 2 moles of ascorbic (or its isomer erythorbic) acid per mole of chlorite ion. In terms of ppm, it takes about 5.2 ppm ascorbic acid (or erythorbic acid) to destroy 1 ppm of chlorite ion.

DETAILED DESCRIPTION OF THE INVENTION

The inventor has performed tests which clearly show that all of the acids activate chlorite to form chlorine dioxide simply because acid functions to lower pH. Acids donate hydrogen ions resulting in the activation of chlorite to produce chlorine dioxide. The fact that some acids depress the pH more than others means that more or less chlorine dioxide is produced.

Ascorbic acid, on the other hand, functions in two distinct ways. It will activate chlorite to form chlorine dioxide because of its acidity, but only after the ascorbate ion has reacted with chlorite. That is, if the chlorite is in excess, then once the ascorbic acid has consumed all the chlorite that it can, the pH depression created by the ascorbic acid will then activate the remaining chlorite to produce chlorine dioxide. If ascorbic acid is in excess, all of the chlorite is consumed, no chlorine dioxide is formed and the chlorite ion is converted to chloride. The inventor deems this to be a major discovery.

Testing of Various Organic Acids for Activation of Chlorite

Various organic acids were tested for reaction with chlorite ion. The acids generally activated $ClO_2$ to $ClO_2$. Of the acids tested, only ascorbic acid consumed chlorite ion. See summary which follows.

Purpose: The purpose of this experiment was to test various organic acids listed in European Patent 0 196 075 for activation or destruction of chlorite ion.

Experiment 1: To several 1% chlorite solutions (1 ml of 25% into 24 mls of water), various organic acids were dissolved. The $ClO_2$ development after several minutes was noted. The results are shown in the following table:

| Organic Acid Activation of Chlorite | | | |
| --- | --- | --- | --- |
| Acid | Gms added | Rxn time (min) | $ClO_2$ measured (as $Cl_2$) |
| Tartaric | 0.64 | 5 | 239 |
| Oxalic | 0.53 | 3 | 628 |
| Adipic | 0.79 | 8 | 73 |
| Citric | 0.77 | 5 | 192 |
| Itaconic | 0.72 | 9 | 105 |
| Ascorbic | 0.68 | 8 | >770 |

Note the significantly larger amount of chlorine dioxide produced by ascorbic acid.

The unusual results set forth in the chart when ascorbic acid was added, led to a repeat of the experiment.

The experiment was repeated, with the exception that >2 gms of each acid was added to a 1% chlorite solution (1 ml of 25% chlorite into 24 ml of water). These results are shown below:

| Organic Acid Activation of Chlorite | | |
| --- | --- | --- |
| Acid | Gms added | Yellow color form ($ClO_2$ formed) |
| Tartaric | 2.42 | Y |
| Oxalic | 2.33 | Y |
| Adipic | 2.00 | Y |
| Citric | 2.21 | Y |
| Itaconic | 2.49 | Y |
| Ascorbic | 2.91 | N |

Yellow (Y) color formed after a minute or so, the intensity varying with the acid. No (N) yellow color formed with ascorbic acid even after ½ hour. The yellow color is used to measure $ClO_2$ directly. Hach, a company that manufactures and sells analytical instruments and reagents for the water treatment industry, sells a spectrophotometer and has a published procedure for direct measurement of $ClO_2$. The instrument measures the yellow color. Thus, if a yellow color is obtained, there is $ClO_2$ present. If no yellow color, this indicates that there is no $ClO_2$ present.

Stearic acid, although mentioned in the European patent, was insoluble in water and not tested. Hydrochloric acid is known to activate chlorite and was eliminated from these tests.

The inventor observes that if ascorbic acid is added at a molar ratio of <2:1, as it was in the first Experiment 1 and the buffering of the water is sufficiently low that a pH reduction occurs, then the pH lowering by the ascorbic acid will be sufficient to convert the unreacted chlorite to $ClO_2$. If ascorbic acid is added at a molar ratio of >2:1, than no $ClO_2$ is formed, thus illustrating that ascorbic acid reacts differently with chlorite than does any of the other organic acids in the European patent.

Conclusions: It is clear from these tests that all of the organic acids will, to a greater or lesser degree, activate chlorite to form $ClO_2$, however, they do not destroy chlorite. Ascorbic acid acts differently than any of the other organic acids, it destroys chlorite. That is, if sufficient ascorbic acid is used, the chlorite is destroyed, reduced to chloride, by ascorbic acid or ascorbate. The other organic acids just depress the pH and cause the ultimate formation of the yellow color ($ClO_2$).

Experiment 2: To determine whether the reaction between ascorbic acid and chlorite was pH dependent; that is, if the pH is low will the reaction slow down or if the pH is high will the reaction slow down. A 1000 ppm chlorite solution was added to 5000 ppm ascorbic acid. This solution was divided into three beakers. One beaker was left at the natural pH of 2.5 (no pH adjustment). The pH of the second and third beakers was adjusted to 7.0 and 8.2, respectively. A 1 ml aliquot of each was taken and $ClO_2$ and chlorite were tested using the Fisher Porter Amperometric titrator using the Aieta method. No chlorite was measured.

Conclusions: Based on experiments performed, the inventor concludes that the reaction of ascorbic acid with chlorite ion is very rapid and pH independent over a pH range of 2.6–8.2.

Broadly considered in the process of chlorite removal, the inventor contemplates employing 1.5–2.5 moles of ascorbic acid per mole of chlorite and more specifically 1.9 to 2.1 moles of ascorbic acid per mole of chlorite. The pH of the reaction can be pH 5–9.

Ascorbic acid and its isomer erythorbic acid have been found to reduce chlorite ion directly to chloride ion, very rapidly and without formation of troublesome by-products or sludge, and the reaction is pH independent.

Ascorbic acid, its isomer erythorbic acid (ET), or the sodium salts (NaET) thereof react very rapidly in aqueous solution with chlorite ion, on the order of seconds, reducing it to chloride ion. No chlorate was produced. The reaction appears to be pH independent within the range of pH 5–9. It does not appear that, unlike other organic acids, it does not appear that any $ClO_2$ is produced.

In a preliminary investigation, a 0.25% solution of $ClO_2^-$ was made by diluting 10 mls of 25% $ClO_2^-$ to 1000 mls. Then, a 0.2% solution of sodium erythorbate (henceforth NaET) was made by dissolving 1.0 g into 100 mls distilled $H_2O$. A 1.0 ml aliquot of the ca. 2500 ppm chlorite solution was taken and added to 150 mls DI water. The sample was tested for chlorite using the amp titrator.

The procedure was repeated except that 10 drops of the NaET was added. The solution was then tested using the amp titrator. This procedure was repeated using 20, and 30 drops of NaET solution. A plot of the results are shown in FIG. 1 which describes preliminary studies wherein the chlorite ion was reduced with erythorbate.

This preliminary experiment was intended to investigate whether the NaET would be operative. The experiment was repeated with the better known isomer of erythorbic acid, ascorbic acid with similar results. The experiment was repeated under more precisely controlled conditions, and the results indicated that 1549 ppm $NaClO_2$ could be reduced to chloride by 5320 ppm ascorbic acid. This is approximately 3.5 ppm ascorbic (or erythorbic) acid to 1 ppm $NaClO_2$. The preliminary experiments were refined and it was found that stoichiometric ratios of ascorbic acid to chlorite is approximately 5.2 to 1.

The following lists several applications which would benefit greatly from the herein disclosed technology:

Use in potable water to reduce chlorite to levels that meet EPA requirements.

Use in emergency drinking water to insure that high chlorite levels are reduced or eliminated.

Use in once-through cooling water systems. $ClO_2$ is used to control micro and macrofouling. The chlorite ion that results from this treatment is generally above the discharge limits placed by the EPA. Ascorbic acid, correctly added, could effectively reduce or eliminate the chlorite ion in the receiving waters.

Use in wastewater to reduce or eliminate chlorite ion that results from $ClO_2$ disinfection. The $ClO_2$ can be applied to the wastewater or it can be applied to a cooling tower or other industrial or environmental process to disinfect or destroy unacceptable molecules, such as phenol.

Potable Water: This includes drinking water, and drinking water to be used for some end use such as in dialysis clinics, where chlorite needs to be zero.

Plant Effluent: This would include once-through cooling water, where biofilm control is targeted, or once through cooling water, where control of zebra mussels is desired. This would include wastewater effluent applications, where the water is disinfected prior to discharge and the chlorite ion needs to be eliminated or reduced to meet NPDES permits. This would include some cooling tower applications, where the water from the cooling tower is not immediately but ultimately discharged.

When used in the field, the inventor contemplates testing water for chlorite and applying effective amounts of ascorbic acid or erythorbic acid or salts thereof to rid the water of chlorite.

In this application, the expression chlorite and chlorite ion have been used interchangeably as understood by those skilled in the art.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. A process for chlorite removal from solution wherein chlorite is converted to chloride using ascorbic acid comprising adding sufficient amounts of ascorbic acid to the chlorite in solution to convert the chlorite to chloride.

2. The process, according to claim 1, where in the molar ratio of the ascorbic acid to the chlorite is 1.5–2.5 moles of ascorbic acid per mole of chlorite.

3. The method claim 2 wherein the molar ratio of ascorbic acid to chlorite is 1.9 to 2.1 moles of ascorbic acid per mole of chlorite.

4. The process, according to claim 1, where the pH is from 5–9.

5. The process, according to claim 1, where no chlorate ions are formed.

6. The process of claim 1 wherein the process is carried out during a manufacturing operation requiring the destruction of chlorite in water in order to make the water non-toxic.

7. A process of claim 1 for the reduction of chlorite to chloride using as alkali metal salt of ascorbic acid.

8. The process of claim 1 wherein about 5 ppm of ascorbic acid is used to consume about 1 ppm of chlorite.

9. The process of claim 1 wherein the solution is in the acid range.

10. The process of claim 1 wherein the process is carried out to rid drinking water of chlorite.

11. The process of claim 1 wherein the process is carried out to rid chlorite from a cooling water system or an industrial waste water system.

12. A process for the reduction of chlorite to chloride using an alkali metal salt of erythorbate comprising adding sufficient amounts of an alkali metal salt of erythorbate.

13. A process for the reduction of chlorite to chloride using erythorbic acid comprising adding sufficient amounts of erythorbic acid to the chlorite to convert the chlorite to chloride.

* * * * *